(12) United States Patent
Tomioka

(10) Patent No.: US 9,298,003 B2
(45) Date of Patent: Mar. 29, 2016

(54) OPTICAL SCANNER AND IMAGE FORMING APPARATUS

(71) Applicant: KYOCERA Document Solutions Inc., Osaka (JP)

(72) Inventor: Hiroyuki Tomioka, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 14/457,358

(22) Filed: Aug. 12, 2014

(65) Prior Publication Data

US 2015/0062679 A1 Mar. 5, 2015

(30) Foreign Application Priority Data

Aug. 30, 2013 (JP) .................................. 2013-178818

(51) Int. Cl.
*G02B 26/08* (2006.01)
*G02B 26/10* (2006.01)
*B41J 2/47* (2006.01)
*B41J 2/44* (2006.01)

(52) U.S. Cl.
CPC ................ *G02B 26/10* (2013.01); *B41J 2/442* (2013.01); *B41J 2/473* (2013.01); *G02B 26/0841* (2013.01)

(58) Field of Classification Search
CPC .... G02B 26/12; G02B 26/121; G02B 26/125; G03G 15/0409
USPC .................................. 359/216.1–219.1, 204.1
See application file for complete search history.

(56) References Cited

U.S. PATENT DOCUMENTS 8,199,391 B2 * 6/2012 Nagase ................ G02B 26/121
359/216.1

FOREIGN PATENT DOCUMENTS

JP 2011-158564 8/2011

* cited by examiner

*Primary Examiner* — Euncha Cherry
(74) *Attorney, Agent, or Firm* — Wenderoth, Lind & Ponack, L.L.P.

(57) ABSTRACT

The light source body of an optical scanner includes a main frame and a disc portion. The main frame is formed into a cylindrical columnar shape so as to irradiate the light beams from a front end thereof. The disc portion protrudes radially outward from a rear end side of the main frame. A side plate of the housing have a through-hole. The side plate includes a support member installed on the outer surface. The support member has an arc surface formed to extend along a edge portion of the through-hole. A pressing member is configured to press the disc portion of the light source body against the arc surface of the support member in such a state that the front end of the main frame is inserted into the through-hole and that an end surface of the disc portion makes contact with the side plate of the housing.

5 Claims, 10 Drawing Sheets

OPTICAL SCANNER AND IMAGE FORMING APPARATUS

CROSS-REFERENCE TO RELATED APPLICATION

This application is based upon and claims the benefit of priority from Japanese Patent Application No. 2013-178818 filed on Aug. 30, 2013, the entire contents of which are incorporated herein by reference.

BACKGROUND

The technology of the present disclosure relates to an optical scanner for use in, e.g., an image forming apparatus such as a copier, a printer or the like, and an image forming apparatus provided with the optical scanner.

There is known an optical scanner installed in an image forming apparatus such as a copier, a printer or the like and configured to have a light beam of a light source body scanned on a photosensitive body. As the light source body of the optical scanner, there is available a so-called multi-beam laser diode that includes a plurality of light emitting points and irradiates a plurality of light beams. In case where the multi-beam laser diode is used as the light source body, it is necessary not only to restrict the positions of the light emitting points in an optical axis direction (light beam irradiation direction) but also to adjust the gaps of the respective light emitting points in an auxiliary scanning direction. In the optical scanner, a bracket to which the multi-beam laser diode is press-fitted and fixed is rotatably attached to a side plate of a housing. By rotating the bracket about an optical axis of the light source body, the gaps of the respective light emitting points in the auxiliary scanning direction are adjusted while restricting the positions of the light emitting points in the optical axis direction. Thereafter, the bracket is fixed to the side plate of the housing.

SUMMARY

An optical scanner according to one aspect of the present disclosure includes a housing configured to accommodate optical scanning parts, a lid member configured to cover the housing, and a light source body configured to irradiate a plurality of light beams toward the optical scanning parts. The light source body includes a main frame and a disc portion. The main frame is formed into a cylindrical columnar shape so as to irradiate the light beams from a front end thereof. The disc portion protrudes radially outward from an outer circumferential surface of the main frame at a rear end side of the main frame opposite to the front end thereof. The housing includes a side plate having a through-hole and an outer surface. The side plate includes a support member installed on the outer surface. The support member has an arc surface formed to extend along a peripheral edge portion of the through-hole. The optical scanner further includes a pressing member. The pressing member is configured to press the disc portion of the light source body against the arc surface of the support member in such a state that the front end of the main frame is inserted into the through-hole and that an end surface of the disc portion makes contact with the side plate of the housing.

DETAILED DESCRIPTION

Embodiments of the present disclosure will now be described in detail with reference to the accompanying drawings. The technology of the present disclosure is not limited to the embodiment described below.

Figure 1:
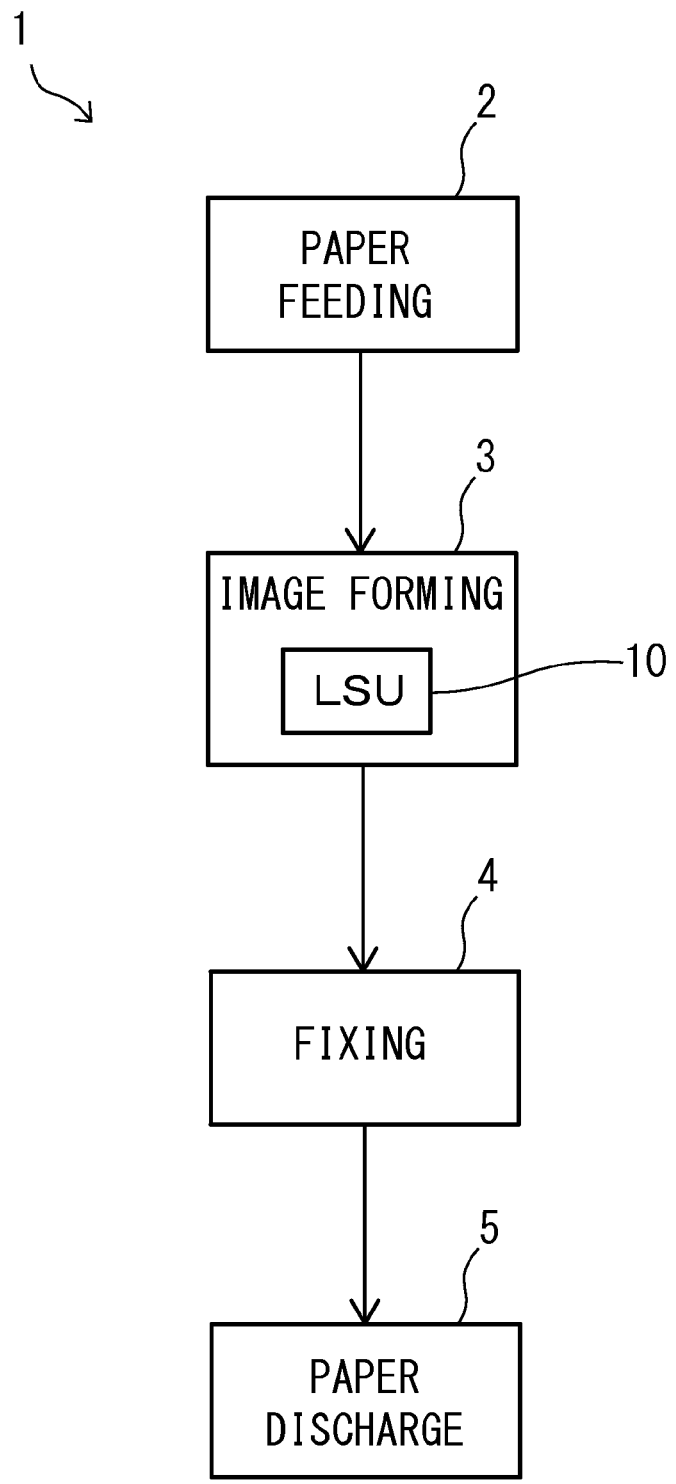
FIG. 1 is a block diagram showing a schematic configuration of an image forming apparatus according to an embodiment.

The image forming apparatus 1 of the present embodiment is, e.g., a laser printer or a multifunction peripheral. The image forming apparatus is configured to, while conveying a paper, form an image on the paper based on image data transmitted from a terminal or the like (not shown). As shown in FIG. 1, the image forming apparatus 1 includes a paper feeding unit 2, an image forming unit 3, a fixing unit 4 and a paper discharge unit 5.

The paper feeding unit 2 is a cassette paper feeding unit or a manual paper insertion tray that supplies a paper to the image forming unit 3. While not shown, the image forming unit 3 includes a photosensitive drum, a charger, a developer and a transfer roller, the latter three of which are disposed around the photosensitive drum. The image forming unit 3 includes a laser scanning unit (LSU) 10 as an optical scanner for emitting a light beam toward the photosensitive drum to form an electrostatic latent image. In the image forming unit 3, a toner image is transferred to the paper supplied from the paper feeding unit 2. While not shown, the fixing unit 4 includes a fixing roller and a pressing roller which are pressed against each other and rotated together. The fixing unit 4 is configured to fix the image (toner image), which was transferred to the paper in the image forming unit 3, to the paper. The paper discharge unit 5 includes a paper discharge tray (not shown) to which the image-formed paper is supplied from the fixing unit 4.

<Laser Scanning Unit>

Figure 2:
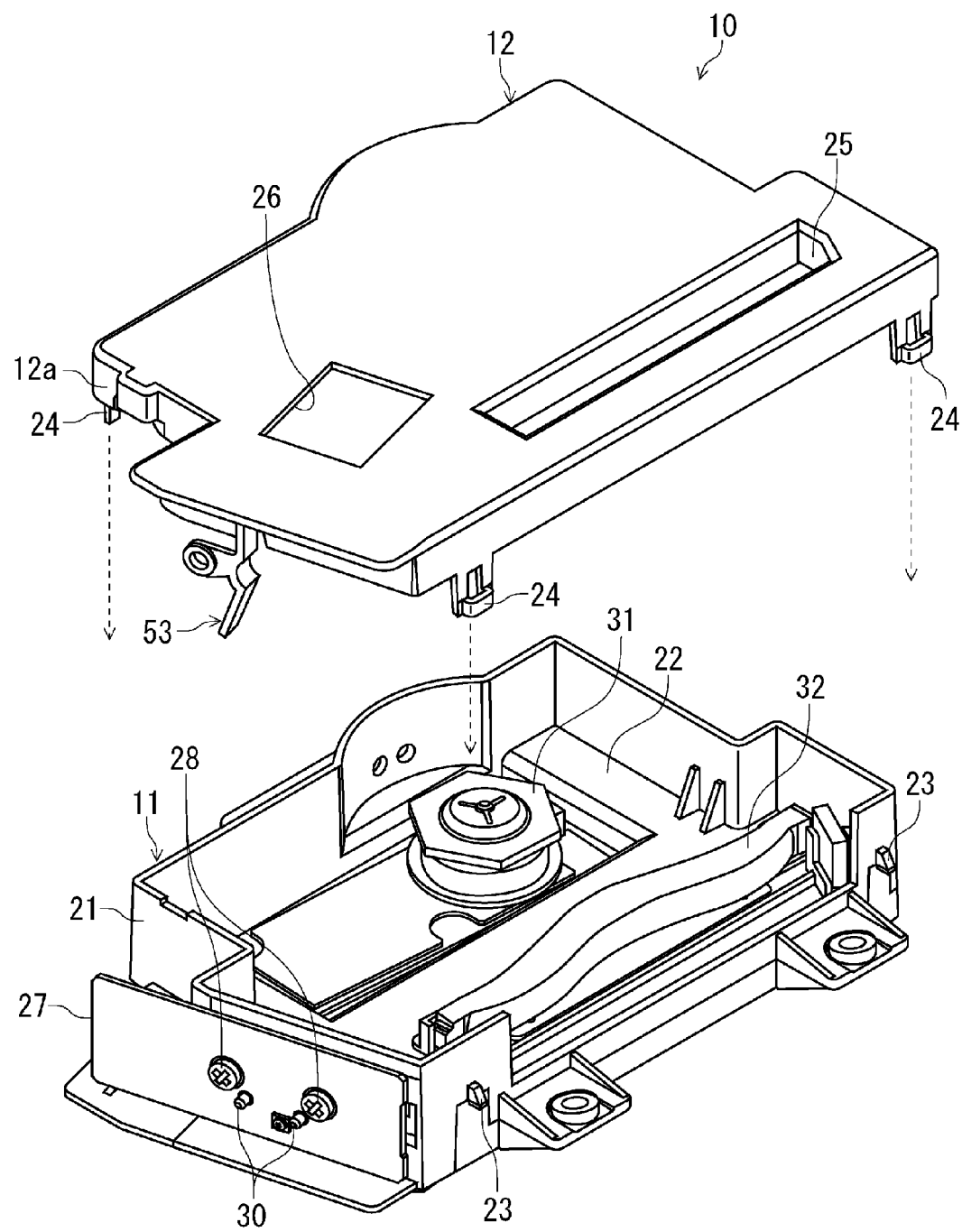
FIG. 2 is an exploded perspective view showing a schematic configuration of a laser scanning unit according to an embodiment.
Figure 3:
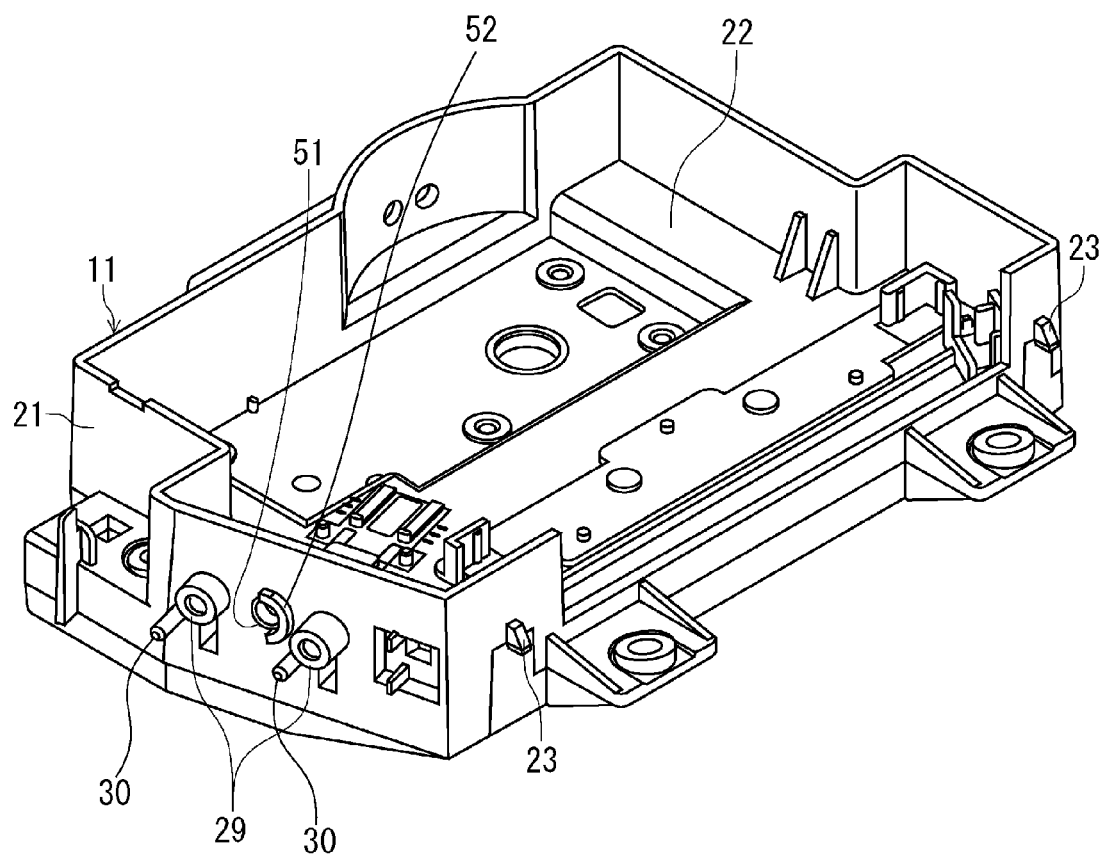
FIG. 3 is a perspective view showing a configuration of a housing of the laser scanning unit.

As shown in FIGS. 2 and 3, the laser scanning unit (equivalent to an optical scanner) 10 includes a housing 11, a lid member 12 mounted to the housing 11. Optical scanning parts to be described later are accommodated within the housing 11.

The housing 11 is configured by a flat box-shaped member with a top portion thereof kept open. The housing 11 is formed of, e.g., a resin material whose strength is increased by glass fibers. The open top portion of the housing 11 is closed by the lid member 12. More specifically, claws 23 are installed in a side plate 21 of the housing 11. Engaging portions 24 that engage with the claws 23 are installed in a side plate 12a of the lid member 12. The claws 23 are fitted into the engaging portions 24, whereby the lid member 12 is mounted to the housing 11.

A polygon mirror 31, an fθ lens 32, a collimator lens 33 (see FIG. 8) and a cylinder lens (not shown), as optical scanning parts, are accommodated within the housing 11. These optical scanning parts are attached to a bottom plate 22 of the housing 11.

Figure 4:
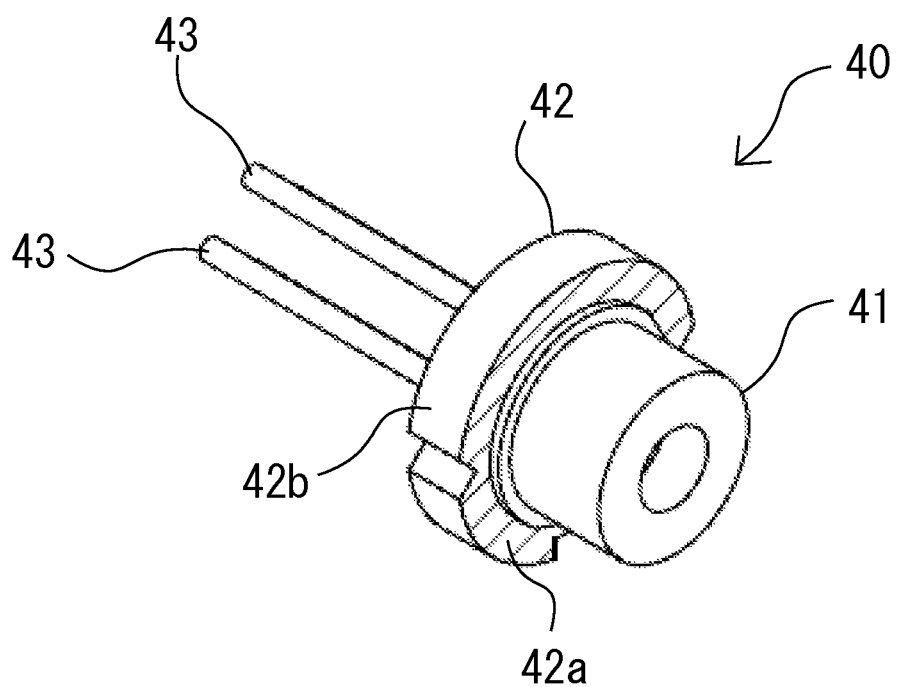
FIG. 4 is a perspective view showing a configuration of a light source body.

One light source body 40 is installed in the housing 11. The light source body 40 of the present embodiment is a so-called multi-beam laser diode array that irradiates a plurality of (four, in the present embodiment) light beams. As shown in FIG. 4, the light source body 40 includes a cylindrical columnar main frame 41, a stem 42 as a disc portion, and a plurality of (four, in the present embodiment) lead wires 43 (only two of which are shown in FIG. 4). A plurality of (four, in the present embodiment) light emitting points is accommodated within the main frame 41. Four light beams are irradiated from the front end (the right end in FIG. 4) of the main frame 41. The stem 42 constitutes a disc portion protruding radially outward from the outer circumferential surface of the main frame 41 at the rear end side of the main frame 41 opposite to the front end thereof. The lead wires 43 are connected to the rear end of the main frame 41.

In the laser scanning unit 10, four light beams irradiated from the light source body 40 are made parallel by the collimator lens 33 and are then collected by the cylinder lens (not shown). The light beam collected by the cylinder lens is deflectively scanned by the polygon mirror 31. The light beam deflectively scanned by the polygon mirror 31 is emitted from an emission hole 25 (see FIG. 2) of the lid member 12 toward the photosensitive drum through the fθ lens 32. Thus, an electrostatic latent image is formed on the photosensitive drum.

Figure 5:
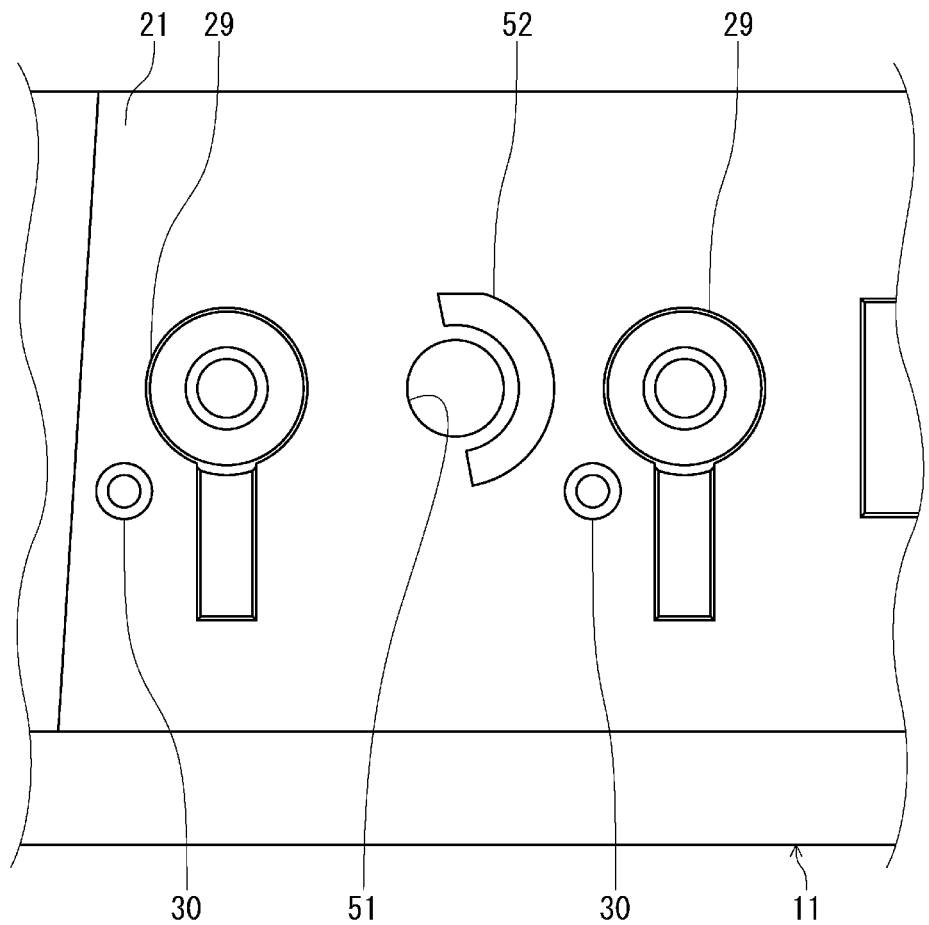
FIG. 5 is a side view showing a major portion of the housing.

As shown in FIGS. 3 and 5, a through-hole 51 is formed in the side plate 21 of the housing 11. A support member 52 having an arc surface extending along a peripheral edge portion of the through-hole 51 is formed on an outer surface of the side plate 21. The main frame 41 of the light source body 40 is inserted into the through-hole 51. The support member 52 restricts the position of the light source body 40 inserted into the through-hole 51. In the side plate 21 of the housing 11, thread holes 29 for attaching the pressing plate 27 to be described later and positioning pins 30 are formed at the opposite sides of the through-hole 51. The light source body 40 is attached to the side plate 21 of the housing 11.

Figure 6:
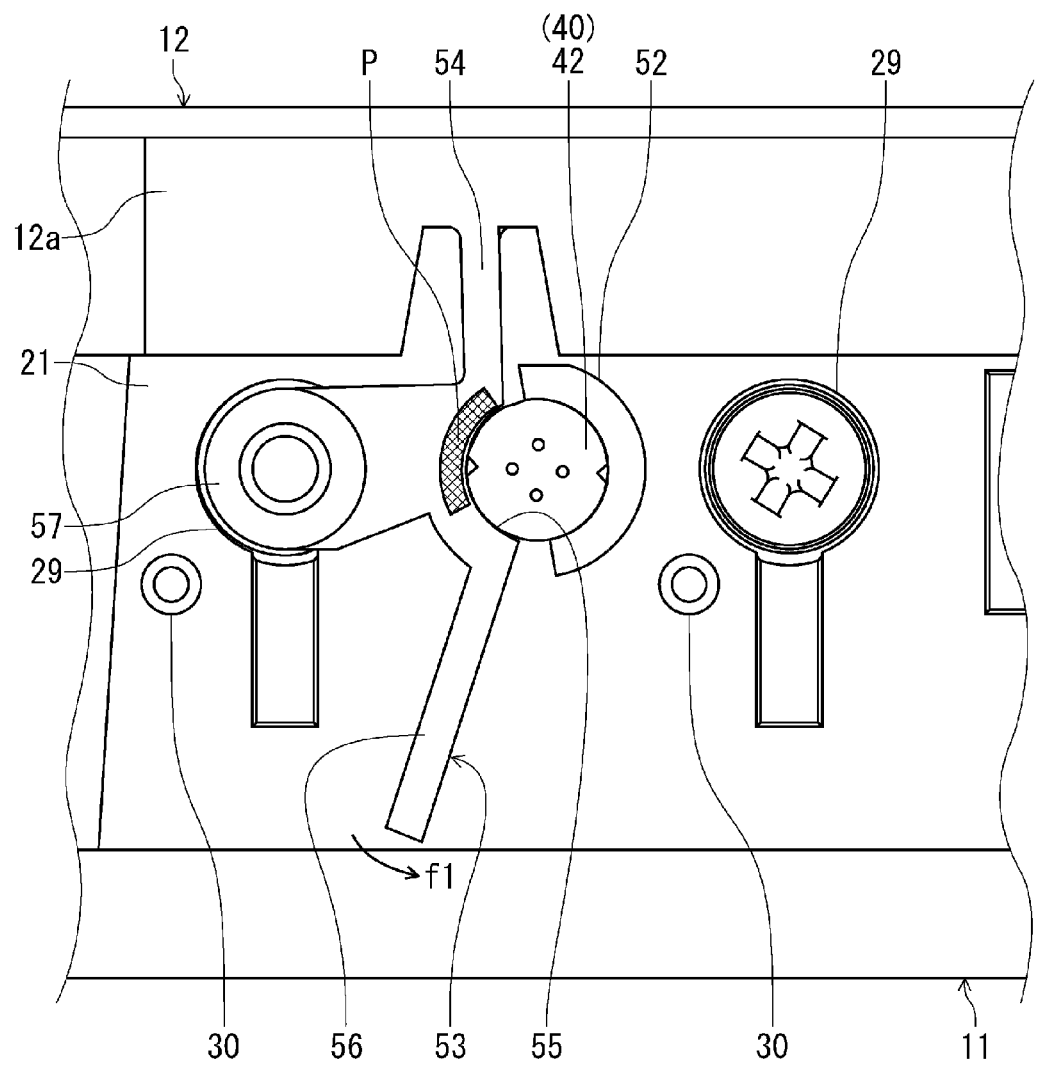
FIG. 6 is a side view showing the major portion of the housing to which a lid member is mounted.
Figure 7:
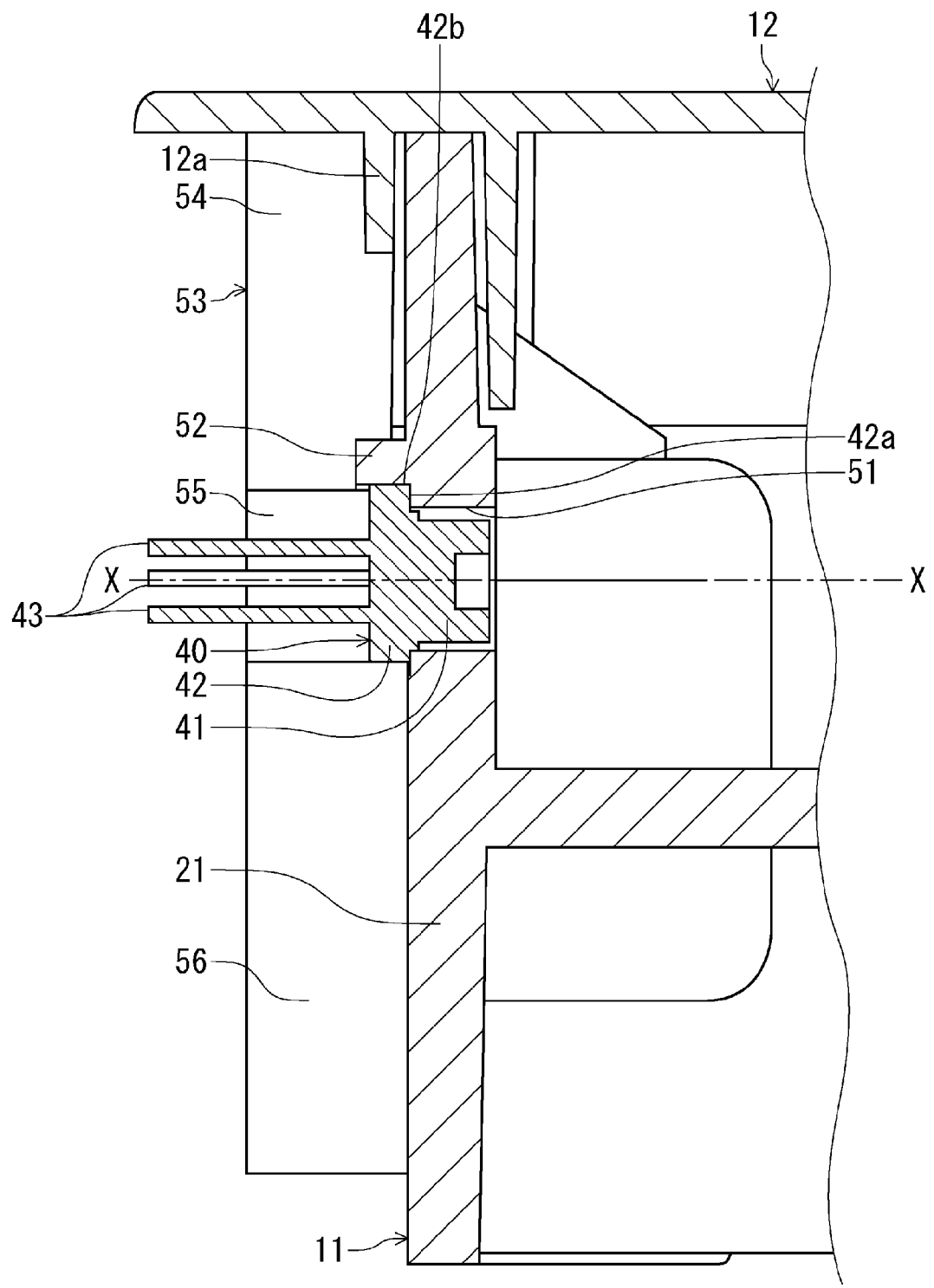
FIG. 7 is a sectional view showing the major portion of the housing to which the lid member is mounted.

As shown in FIGS. 2, 6 and 7, a pressing member 53 for restricting the position of the light source body 40 is formed in the lid member 12. The pressing member 53 is configured to press the stem 42 against the arc surface of the support member 52 in such a state that the front end of the main frame 41 of the light source body 40 is inserted into the through-hole 51 and that the end surface 42a of the stem 42 makes contact with the side plate 21 of the housing 11.

More specifically, the pressing member 53 includes a base portion 54 continuously formed with the side plate 12a of the lid member 12, an arc portion 55 continuously formed with the base portion 54, an end portion 56 continuously formed with the arc portion 55, and a fixing hole portion 57. The pressing member 53 is an elastic piece fixed to the lid member 12 at one end (at the side of the base portion 54) and remaining free at the other end (at the side of the end portion 56). The pressing member 53 is configured such that the arc portion 55 makes contact with an outer circumferential surface 42b of the stem 42 of the light source body 40 and presses the stem 42 against the support member 52 by an elastic force. In other words, the pressing member 53 is one-piece formed with the lid member 12 and is configured such that, when the lid member 12 is mounted to the housing 11, the pressing member 53 makes contact with the outer circumferential surface 42b of the stem 42 of the light source body 40 to press the stem 42.

<Attaching Procedure of Light Source Body>

First, the main frame 41 of the light source body 40 is inserted into the through-hole 51 of the housing 11, and the end surface 42a of the stem 42 of the light source body 40 is brought into contact with the side plate 21 of the housing 11 (see FIG. 7). The polygon mirror 31 and the fθ lens 32 are previously installed within the housing 11.

Subsequently, the lid member 12 is mounted to the housing 11. During the mounting process, the pressing member 53 is flexed (elastically deformed) about the base portion 54. The arc portion 55 is fitted to the stem 42 of the light source body 40. That is to say, the arc portion 55 makes contact with the outer circumferential surface 42b of the stem 42 of the light source body 40. As a result, the stem 42 (the light source body 40) is pressed against the support member 52 by the elastic force of the pressing member 53. Furthermore, as shown in FIG. 6, the end portion 56 of the pressing member 53 is swung by a jig or the like, thereby applying a pressing force f1 to the stem 42. At this time, the region of the arc portion 55 indicated by P in FIG. 6 becomes a pressing portion. Thus, the position of the light source body 40 in the optical axis direction (the direction of an axis X-X shown in FIG. 7) and the position of the light source body 40 in the radial direction (the radial direction of the stem 42) are restricted. The pressing force f1 is set such that the light source body 40 can be rotated about the optical axis.

Figure 8:
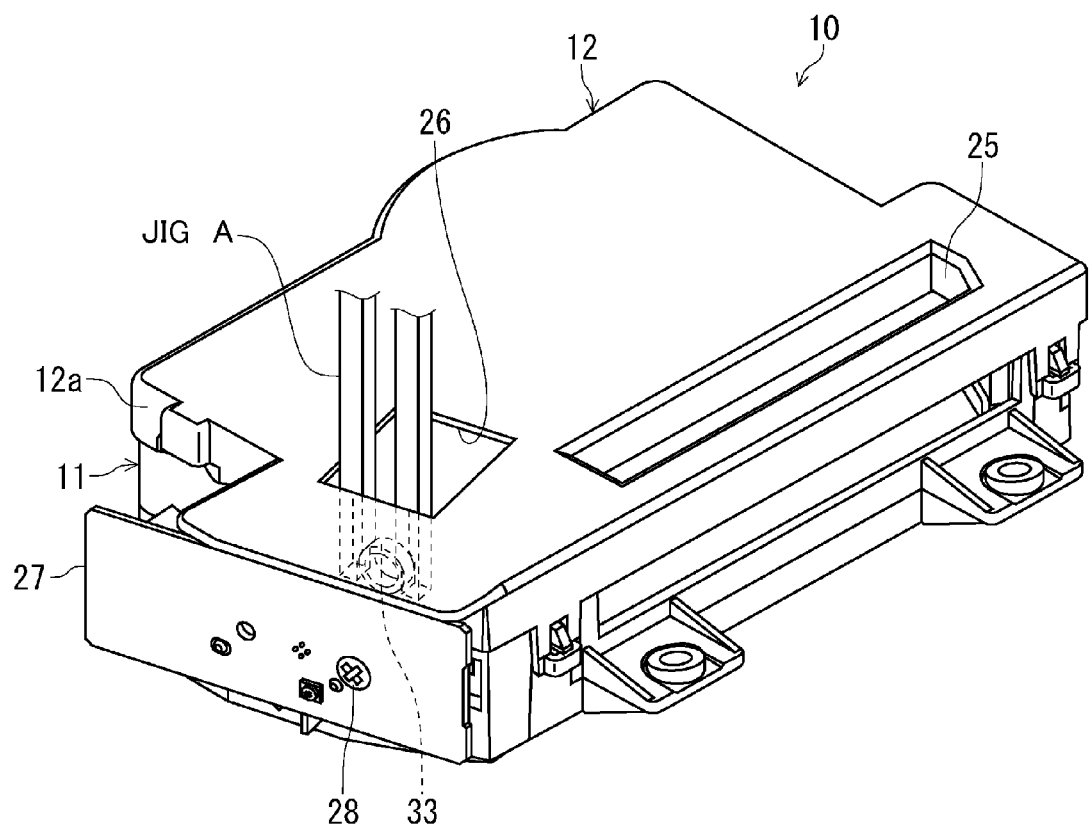
FIG. 8 is a perspective view showing the laser scanning unit during the adjustment of a collimator lens.

Then, the collimator lens 33 and the cylinder lens are installed within the housing 11. As shown in FIG. 8, a jig hole 26 is formed in the lid member 12. The collimator lens 33 and the cylinder lens are installed into the housing 11 through the jig hole 26 of the lid member 12 by virtue of a jig A. Then, the positions of the collimator lens 33 and the cylinder lens are adjusted by the jig A. That is to say, the distance (optical-axis-direction distance) between the light emitting points of the light source body 40 and the collimator lens 33 and the distance (optical-axis-direction distance) between the collimator lens 33 and the cylinder lens are adjusted.

Figure 9:
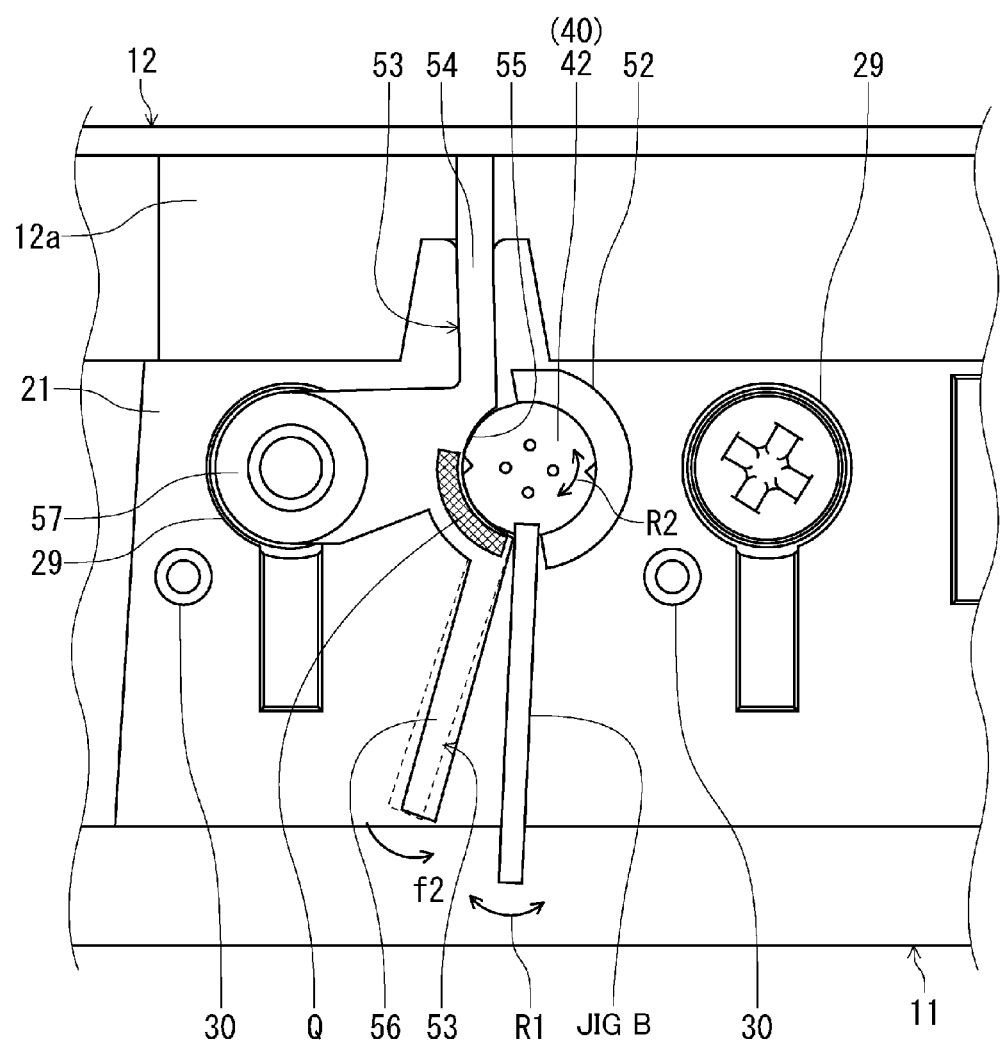
FIG. 9 is a view similar to FIG. 6, showing the major portion of the housing to which a lid member is mounted.

Next, the rotation angle of the light source body 40 is adjusted. As shown in FIG. 9, by inserting a jig B into the stem 42 of the light source body 40 and rotating the jig B (as indicated by R1 in FIG. 9), the stem 42 (the light source body 40) is rotationally adjusted about the optical axis (as indicated by R2 in FIG. 9). Thus, the gaps between the respective light emitting points of the light source body 40 in the auxiliary scanning direction are adjusted.

If the adjustment of the gaps between the respective light emitting points in the auxiliary scanning direction is finished, the end portion 56 of the pressing member 53 is rotated by a jig or the like, thereby applying a pressing force f2 to the stem 42. Thus, the stem 42 (the light source body 40) cannot be rotated. At this time, the region of the arc portion 55 indicated by Q in FIG. 9 becomes a pressing portion. Then, while applying the pressing force f2 to the stem 42, a pressing plate 27 is fixed to the side plate 21 of the housing 11 by screws 28 (see FIGS. 1 and 10). At this time, as shown in FIGS. 6 and 9, the fixing hole portion 57 of the pressing member 53 is disposed at the same position as the screw hole 29. Thus, the pressing member 53 and the pressing plate 27 are fixed together by the screw 28. That is to say, the pressing member 53 and the pressing plate 27 are fixed to the side plate 21 of the housing 11 by the screw 28 in such a state that a pressing force acting toward the stem 42 is applied to the pressing member 53 by a jig or the like. Thus, the light source body 40 is fixed in such a state that the pressing force f2 is applied thereto. In the aforementioned manner, the attachment of the light source body 40 is finished.

As described above, the laser scanning unit 10 of the present embodiment is provided with the pressing member 53 which presses the stem 42 against the support member 52 in such a state that the main frame 41 of the light source body is inserted into the through-hole 51 and that the end surface 42a of the stem 42 is brought into contact with the side plate 21 of the housing 11. For that reason, it is possible to restrict the positions of the light emitting points in the optical axis direction and to adjust the gaps between the respective light emitting points in the auxiliary scanning direction, while excluding the press-fitting step of the light source body 40. This makes it possible to reduce the man-hours required in assembling the laser scanning unit 10.

Furthermore, the pressing member 53 is an elastic piece fixed to the lid member 12 at one end and remaining free at the other end. The pressing member 53 is configured to make contact with the outer circumferential surface 42b of the stem 42 and to press the stem 42 by an elastic force. Thus, there is no need to use a plurality of members, namely a member for generating an elastic force and a pressing member. It is therefore possible to reduce the number of parts.

Moreover, in the present embodiment, the pressing member is one-piece formed with the lid member 12 and is configured such that, when the lid member 12 is mounted to the housing 11, the pressing member 53 makes contact with the outer circumferential surface 42b of the stem 42 to press the stem 42. Since optical scanning parts that require high positional accuracy are accommodated within the housing 11, high rigidity is required in the housing 11 such that the housing 11 should not be easily deformed. On the other hand, the lid member 12 does not require high rigidity because it is only necessary that the lid member 12 has a function of closing the housing 11. In a hypothetical case where the elastically deformable pressing member is one-piece formed with the housing, the rigidity of the housing as a whole decreases. This makes it difficult to secure the required rigidity. In the present embodiment, the pressing member 53 is one-piece formed with the lid member 12 that does not require high rigidity. It is therefore possible to prevent reduction in the rigidity of the housing 11.

In addition, the position of the light source body 40 is restricted by forming the pressing member 53 in the lid member 12 and mounting the lid member 12 to the housing 11. This may make it difficult to adjust the positions of the optical scanning parts arranged within the housing 11. In the present embodiment, the jig hole 26 is formed in the lid member 12. For that reason, even when the lid member 12 is mounted to the housing 11, it is possible to gain access to the optical scanning parts through the jig hole 26 and to adjust the positions of the optical scanning parts.

Figure 10:
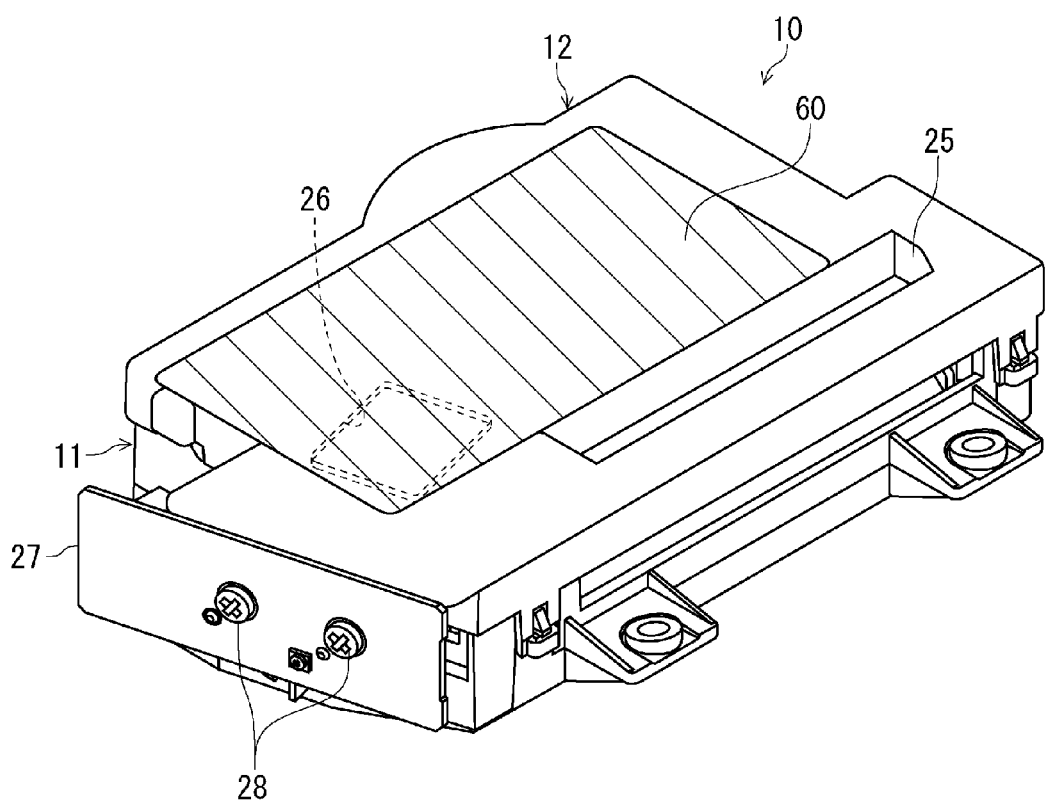
FIG. 10 is a perspective view showing the laser scanning unit to which a label is affixed.

In the meantime, due to the formation of the jig hole 26 in the lid member 12, there is a fear that dust may come into the housing 11 through the jig hole 26. In the present embodiment, as shown in FIG. 10, a label 60 for covering the jig hole 26 is affixed to the lid member 12. This makes it possible to prevent dust from infiltrating into the housing 11. For example, handling instructions are written on the label 60.

Other Embodiments

While the pressing member 53 is formed in the lid member in the aforementioned embodiment, the pressing member 53 may be formed in the housing 11.

While the pressing member 53 is formed of an elastic piece having an elastic force in the aforementioned embodiment, the pressing member 53 may be configured by a member having an elastic force, such as a spring or the like, and a member biased by the member having an elastic force so as to press the stem 42.

The image forming apparatus according to the present embodiment is not limited to the laser printer or the multifunction peripheral but may be, e.g., a copier or a scanner.

As described above, the technology of the present disclosure is useful in an optical scanner for use in an image forming apparatus such as a copier, printer or the like and is also useful in an image forming apparatus provided with the optical scanner.

What is claimed is:

1. An optical scanner, comprising:
a housing configured to accommodate optical scanning parts;
a lid member configured to cover the housing; and
a light source body configured to irradiate a plurality of light beams toward the optical scanning parts, wherein
the light source body includes a cylindrical columnar main frame configured to irradiate the light beams from a front end thereof and a disc portion protruding radially outward from an outer circumferential surface of the main frame at a rear end side of the main frame opposite to the front end thereof,
the housing includes a side plate having a through-hole and an outer surface, the side plate including a support member installed on the outer surface, the support member having an arc surface formed to extend along a peripheral edge portion of the through-hole,
the optical scanner further comprises a pressing member configured to press the disc portion of the light source body against the arc surface of the support member in such a state that the front end of the main frame is inserted into the through-hole and that an end surface of the disc portion makes contact with the side plate of the housing, and
the pressing member is an elastic piece fixed to the housing or the lid member at one end and remaining free at another end, the pressing member configured to make contact with an outer circumferential surface of the disc portion and to press the disc portion by an elastic force.

2. The optical scanner of claim 1, wherein the pressing member is one-piece formed with the lid member and is configured such that, when the lid member is mounted to the housing, the pressing member makes contact with the outer circumferential surface of the disc portion to press the disc portion.

3. The optical scanner of claim 2, wherein a jig hole through which a jig for adjusting positions of the optical scanning parts is inserted is formed in the lid member, and a label for covering the jig hole is affixed to an outer surface of the lid member.

4. The optical scanner of claim 3, wherein the pressing member formed in the lid member is fixed, together with a pressing plate, to the side plate of the housing by a screw in such a state that a pressing force acting toward the disc portion is applied to the pressing member by a jig.

5. An image forming apparatus provided with the optical scanner of claim 1.

* * * * *